United States Patent
Colgan et al.

(10) Patent No.: US 6,424,388 B1
(45) Date of Patent: *Jul. 23, 2002

(54) REFLECTIVE SPATIAL LIGHT MODULATOR ARRAY

(75) Inventors: Evan George Colgan, Chestnut Ridge; James McKell Edwin Harper, Yorktown Heights, both of NY (US); Frank Benjamin Kaufman, Geneva, IL (US); Margaret Paggi Manny, Mahopac, NY (US); Robert Lee Melcher, Mt. Kisco, NY (US); James Louis Speidell, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/124,449

(22) Filed: Jul. 29, 1998

Related U.S. Application Data (63) Continuation-in-part of application No. 08/999,663, filed on Dec. 18, 1997, which is a continuation of application No. 08/803,210, filed on Feb. 21, 1997, now Pat. No. 5,706,067, which is a continuation of application No. 08/431,370, filed on Apr. 28, 1995, now abandoned.

(51) Int. Cl.[7] .................. G02F 1/135; G02F 1/1333; G02F 1/1335
(52) U.S. Cl. .................. 349/27; 349/38; 349/113; 349/110
(58) Field of Search .................. 349/27, 29, 110, 349/114, 113, 38

(56) References Cited

U.S. PATENT DOCUMENTS

| | | | | |
|---|---|---|---|---|
| 5,056,895 A | * | 10/1991 | Kahn | .................. 359/87 |
| 5,461,501 A | * | 10/1995 | Sato et al. | .................. 359/59 |

FOREIGN PATENT DOCUMENTS

| | | |
|---|---|---|
| JP | 55-95980 | 7/1980 |
| JP | 57-20778 | 2/1982 |
| JP | 57-66472 | 4/1982 |
| JP | 2-245741 | 10/1990 |
| JP | 06194690 A | 7/1994 |
| JP | 08-122761 A | 5/1996 |
| JP | 08-166601 A | 6/1996 |
| JP | 08-304853 A | 11/1996 |

* cited by examiner

*Primary Examiner*—Toan Ton
(74) *Attorney, Agent, or Firm*—Daniel P Morris (57) ABSTRACT

Reflective spatial light modulator array is described incorporating liquid crystal devices, mirrors, a semiconductor substrate, electrical circuits, and a reflector/absorber layer for blocking light. The invention overcomes the problem of shielding light from semiconductor devices, high optical throughput and contrast, pixel storage capacitance to hold the voltage across the liquid crystal device and precise control of the liquid crystal device thickness without spacers obscuring the mirrors.

26 Claims, 9 Drawing Sheets

REFLECTIVE SPATIAL LIGHT MODULATOR ARRAY

This is a continuation-in-part of co-pending application Ser. No. 08/999,663 filed Dec. 18, 1997 which is a continuation of application Ser. No. 08/803,210 filed Feb. 21, 1997 now issued as U.S. Pat. No. 5,706,067 which is a continuation of application Ser. No. 08/431,370, filed Apr. 28, 1995 now abandoned the teachings of all of which are incorporated herein by reference.

FIELD OF THE INVENTION

This invention relates to display devices and more particularly to a spatial light modulator array on a semiconductor substrate with appropriate control circuits for controlling respective pixels.

BACKGROUND OF THE INVENTION

Spatial light modulator (SLM) arrays, also referred to as light-valve arrays are used in projection displays, optical interconnects, holographic storage, and other applications where light is modulated spatially and temporally in response to an array of data. There are a number of advantages to Si based SLM's. With a Si based reflective SLM, high optical throughput can be achieved even with small pixels because the address lines and pixel storage capacitors do not block the light as in a transmissive display where the light passes through the substrate. With single crystal Si transistors, the transistor switching speeds are faster than with amorphous-Si or polycrystalline Si transistors now used for flat panel displays and would permit displays with a higher frame rate and higher information content. Additionally, even older Si chip manufacturing facilities can support much finer feature sizes on a SLM than are available with current flat panel manufacturing technology. Minimizing the feature size and hence the pixel size is desirable since the size of the other optical components for a display scale with the size of the SLM.

In U.S. Pat. No. 4,999,619 by T. S. Te Velde which issued Mar. 12, 1991, an electro-optic display device is described having a layer of liquid crystalline material between a first transparent supporting plate having at least one transparent first control electrode and a second supporting plate and at least one semiconductor body having one or more switching elements for driving a picture element matrix arranged in rows and columns and having picture electrodes which can be electrically driven separately. The second supporting plate may be provided with an additional reflective layer (dielectric mirror) which covers the picture elements and (possible) intermediate parts of the semiconductor material. The intermediate semiconductor material is then still better shielded from incident light.

In a publication by J. Glueck et al., entitled "Improvement in light efficiency of a-Si:H TFT-addressed reflective λ/4-HAN-Mode light valves for Color TV projection", p. 299, SID 1993 Digest, a large optical active area is achieved by placing the TFT's, the storage capacitors, and the row and column lines underneath an array of reflective Aluminum pixel electrodes to provide a-Si:H TFT-addressed light valve with a resolution of 400 by 200 pel, a pixel size of 50 μm by 55 μm and an aperture ratio of 84%.

In a publication by A. O'Hara et al., entitled "Mirror quality and efficiency improvements of reflective spatial light modulators by the use of dielectric coatings and chemical-mechanical polishing" Applied Optics, 32,5549 (1993), the mirror quality for a spatial light modulator was improved either by coating the mirror on top with silicon dioxide or by chemical-mechanical polishing silicon dioxide below before depositing the aluminum to form the mirror.

With flat panel displays, plastic spheres a few microns in size may be randomly dispersed in the liquid crystal device gap to serve as spacers. For the very small pixel size being used (17 µm on a side) this is not practical as a single spacer ball could block 4% of the area of a mirror which is significant since with a 4-bit grey scale the least significant bit corresponds to 6% and any clustering of spheres could cause more severe mirror shadowing.

The use of rigid $SiO_2$ spacers built on the front glass has been reported by J. Glueck et al., "Color-TV projection with fast-switching reflective HAN mode light valves", p. 277, SID 1992 Digest and J. Glueck et al., p. 299, SID 1993 Digest, cited above. U.S. Pat. No. 4,999,619 by T. S. Te Velde cited above, describes spacers or posts formed from a layer of magnesium oxide by photolithography and etching.

SUMMARY OF THE INVENTION

In accordance with the present invention, a spatial light modulator array for modulating light and its fabrication is provided comprising a plurality of liquid crystal devices positioned over respective mirrors on a dielectric layer on a semiconductor substrate, a plurality of electrical circuits formed in the semiconductor substrate coupled to the liquid crystal devices, respectively, for modulating light passing there through, and a reflector/absorber layer positioned and patterned with respect to the mirrors. The reflector/absorber layer provides optical shielding for the plurality of electrical circuits from ambient and the impinging light, the reflector/absorber layer having an edge overlapping an edge of the mirror to form an overlapping region to attenuate the ambient and impinging light from passing into the semiconductor substrate by a factor of about 100,000 or higher.

BRIEF DESCRIPTION OF THE DRAWING

These and other features, objects, and advantages of the present invention will become apparent upon consideration of the following detailed description of the invention when read in conjunction with the drawing in which.

DESCRIPTION OF THE PREFERRED EMBODIMENTS

Figure 1:
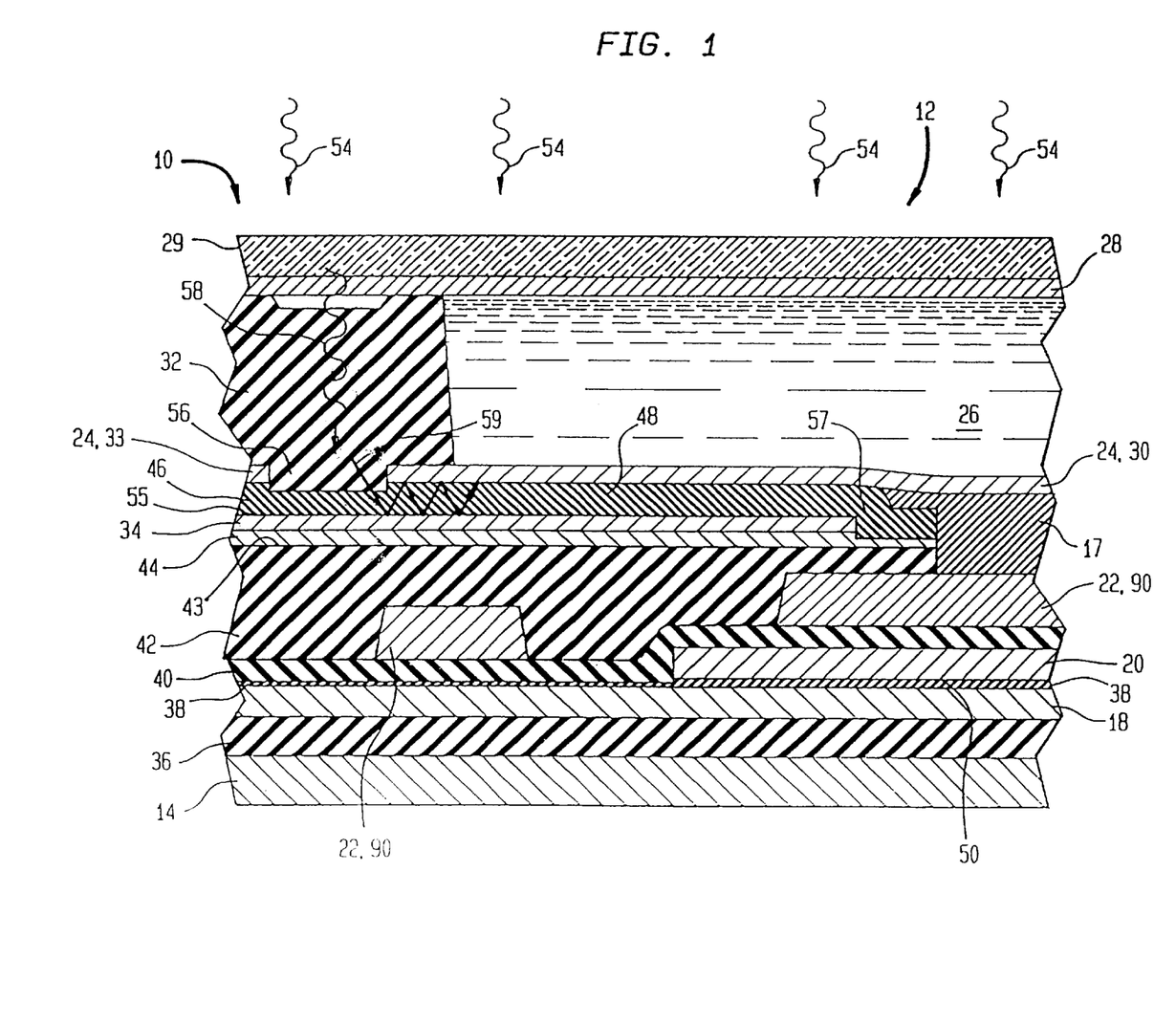
FIG. 1 is a cross section view of one embodiment of the invention.

Referring to FIG. 1, a cross section view of one half of a spatial light modulator 10 is shown. Spacial light modulators and liquid crystal displays useful to practice the present invention are described in detail in U.S. Pat. No. 5,623,354 entitled Liquid Crystal Display With Multi-domains to lien et al. the teaching of which is incorporated herein by reference and in co-pending U.S. application Ser. No. 08/644,788 filed on May 10,1996 entitled Method And Apparatus for Forming An Alignment Pattern on a surface using A particle Beam Useful For a Liquid Crystal to Chaudhari et al., the teaching of which is incorporated herein by reference. The teaching of U.S. Pat. No. 5,652,667 entitled Liquid Crystal Display Apparatus to Kurogane is incorporated herein by reference. A plurality of spatial light modulators 10 may be simultaneously formed in an array 11 such as 2048 by 2048 pixels. The pixel size may be 17 micron on a side using 1.4 micron lithography. A liquid crystal device 12 is shown positioned over substrate 14, which may be a single crystal semiconductor or semiconductor on insulator (SOI) such as Si or SiGe, containing a plurality of electrical circuits 16 (not shown) which are connected by interlevel vias (such as via or stud 17), polysilicon layers 18 and 20, and metal layer 22. Liquid crystal device 12 comprises a liquid crystal material 26, a top electrode 28 which may be for example In—Sn oxide (ITO), a bottom electrode/mirror 30 which functions as an electrode and a mirror, and spacer 32 for spacing top electrode 28 and bottom electrode 30. The surfaces of electrodes 28 and 30 in contact with liquid crystal material 26 have an orientation property which is typically provides by an orientation film disposed thereon, such as a file of rubbed polyimide. Spacer 32 is not needed for each liquid crystal device 12. A reflector/absorber layer 34 functions to block or attenuate ambient light and impinging light on spatial light modulator 10 and passing through openings or gaps 56 between mirrors such as bottom electrode/mirror 33 and bottom electrode mirror 30 shown by arrows 54, 58 and 59 from passing into semiconductor substrate 14. If the layer 34 is sufficiently absorbing it cna have low reflectivity. If the layer 46 is sufficiently absorbing surface 55 can have low reflectivity. The objective is to minimize the light 58 passing through all the layers beneath by absorption or relection to minimize the light reaching the devices in the substrate below.

To complete the description of spatial light modulator 10, a dielectric layer 36 is positioned between substrate 14 and polysilicon layer 18 which may be for example thermal oxide. A thin dielectric layer 38 which may be about 650 .ANG. is positioned between polysilicon layers 18 and 20. A dielectric layer 40 is positioned between polysilicon layer 20 and/or dielectric layer 38 and metal layer 22 and/or dielectric layer 42. Dielectric layer 38 may be thermally grown on polysilicon layer 18. Dielectric layer 40 and 42 may be formed by chemical vapor deposition (CVD) such as with TEOS as the precursor gas. As shown in FIG. 1, dielectric layer 42 may have an upper surface 43 which is chemically mechanically polished to provide a planarized upper surface 43. A dielectric layer 44 may be formed over dielectric layer 42 of the same material. Dielectric layer 46 is formed over reflector/absorber layer 34 and fills the gap between reflector/absorber layer 34 and metal layer 24 and/or electrode/mirror 30. Dielectric layer 46 preferably has high optical absorption to absorb the maximum amount of light 58 passing through opening 56 to minimize the amount of light reaching the circuits below and where material 46 is the dielectric material of a capacitive element it preferably has the highest dielectric constant possible. Non-limiting examples of high dielectric constant materials are silicon nitride and silicon dioxide. Silicon nitride has a a high dielectric constant (epsilon) of about 7. Non-limiting examples of more highly optically absorbing materials are SiGe(H), black SiGe, black pigmented polymers, and polymers having suitable optical absorption. SiGe materials can be sputter deposited. A 130 nm layer of SiGe(H) has transmission of about 1%, 8%, and 26% at 450, 550, and 680 nm, respectively. Non-limiting examples of polymers having suitable optical absorption properties are described in U.S. Pat. No. 5,619,357 (Flat Panel Display Containing Black Matrix Polymer to Angelopoulos et al.), the teaching of which is incorporated herein by reference an which teaches a thin film transistor display that comprises a black matrix polymer layer, comprising a polymer having an optical density of at least about 0.8 per µm and being self-absorbent of visible light and being selected from the group consisting of substituted and unsubstituted polyanilines, substituted and unsubstituted polyparaphenylenevinylenes, substituted and unsubstituted polythiophenes, substituted and unsubstituted polyazines, substituted and unsubstituted polyparaphenylenes, substituted and unsubstituted polyfuranes, substituted and unsubstituted polypyrroles, substituted and unsubstituted polyselenophene, substituted and unsubstituted poly-p-phenylene sulfides and substituted and unsubstituted polyacetylenes, and mixtures thereof, and copolymers thereof. The layer also comprises one or more pigments. The resistivity of the black matrix composite is 10E12 to 10E14 ohm cm. Suitable polymers area sloso taught in in U.S. Pat. No. 5,155,777 (Scattered Light Blocking Layer For Opto-electronic Receivers to Angelopoulos et al.), the teachings of which are incorporated herein by reference and which teaches methods, apparatus and manufacturing processes are set forth which reduce the affects of scattered light in electro-optical devices, fiber optic links, etc., through the use of radiation sensitive compounds which, for example, can be easily applied to a semiconductor wafer when fabricating a solid state integrated receiver. According to the invention, a given radiation sensitive compound is transformed into a light blocking material (i.e., a material that will not transmit light) as a result of a lithographic (and in some cases a photolithographic) process. The resultant blocking material may be easily removed from any regions which is designed to receive transmitted light (for example, detector regions); while any other light sensitive regions remain covered (i.e., are protected) by the blocking material at the conclusion of the process. Layer 46 is used to form a capacitor 48 between metal layer 24 and reflector/absorber layer 34. Capacitor 48 is coupled (interconnections are not shown) with capacitor 50 formed by polysilicon layer 18, dielectric layer 38 and polysilicon layer 20 which functions to hold the voltage on electrode/mirror 30. Reflector/absorber layer 34 may be at ground potential.

The functional requirements for a reflective spatial light modulator 10 include 1) shielding the semiconductor substrate 14 from the incident light (ambient and impinging), 2) high optical throughput and contrast, 3) pixel storage capacitance, and 4) precise control of the liquid crystal cell thickness without spacers obscuring the mirrors. As shown in FIG. 1, spacer 32 does not obscure electrode/mirror 30. Spacer 32 is not repeated for every pixel but are positioned at intervals necessary to keep cover plate 52 at a uniform distance above bottom electrode/mirror 30. One spacer may be needed for anywhere from 10 to 400 pixels.

With the structure shown in FIG. 1, shielding the semiconductor devices in substrate 14 forming electrical circuits 16 from light is accomplished by the combination of electrode/mirror 30, and reflector/absorber layer 34. Both the electrode/mirror 30 and reflector/absorber layer 34 are sufficiently thick so that they are optically opaque. Light or radiant energy 54 and 58 incident in opening 56 between electrode/mirrors 30 and 33 (partially shown on the left side of 30 in FIG. 1) of liquid crystal device 12 and the adjacent liquid crystal device would enter dielectric layer 46 and would require multiple reflections as shown by arrow 59 between top surface 55 of reflector/absorber layer 34 and the bottom surface of electrode/mirror 30 to reach dielectric layers 44, 42, 40, and 36 and semiconductor substrate 14 containing electrical circuits 16 (not shown). The top surface 55 of reflector/absorber layer 34 may be TiN, which has a reflectivity of between 20% for blue light and 65% for red light. For red light incident at 7 degrees off normal, nearly one hundred reflections as shown by arrow 59 would be needed for reflected light to reach opening 57 around stud 17 and the intensity would be reduced or attenuated by over $10^{-19}$. Outside the array of liquid crystal devices 12, a blanket reflector/absorber layer 34 may be used to protect the semiconductor devices from incident light or radiant energy 54.

The optical throughput depends on the fraction of the area of the spatial light modulator 10 occupied by electrode/mirrors 30, the reflectivity of electrode/mirrors 30, and the flatness of electrode/mirrors 30. The electrode/mirrors 30 fill factor is determined by the smallest space which can be reliably patterned between adjacent electrode mirrors 30 and 33 and depends on the available lithography and patterning technology. For spatial light modulator 10 shown in FIG. 1, the electrode/mirror diameter or width or pixel size is 17 µm on a side with a nominal space of 1.7 µm between electrode/mirrors 30; the electrode/mirror 30 fill factor is 81%. A reduced space is possible, but increases the probability of electrode/mirror 30 to electrode/mirror shorts because of the very large array area i.e. 2,048 by 2,048 pixels. The electrode/mirrors 30 are made of Al or an alloy of Al since Al is one of the most reflective metals e.g. 92% on average for the wavelengths of interest and Al—Cu alloys are commonly used for semiconductor metallizations such as described in U.S. Pat. No. 3,725,309 by Ames et al., which issued April 1973 and assigned to the assignee herein. The copper is added to aluminum to improve the electromigration performance and to reduce hillock formation. Silver is slightly more reflective, e.g. 93%, but Ag rapidly oxidizes and is not compatible with typical semiconductor fabrication processes. A disadvantage with using Al is the formation of hillocks during thermal cycling due to the thermal expansion mismatch with the substrate. The hillock formation can be minimized by limiting the heat treatments after deposition of metal layer 24 or by limiting the Al grain size. Typical processing temperatures reached after metal layer 24 is formed are 400° C., which might be reduced to 350° C. The Al grain size can be reduced by limiting the film thickness of metal layer 24, or by alloy additions. Reducing the Al film thickness too far can result in agglomeration of the film after annealing, which also reduces the reflectivity.

Figure 2:
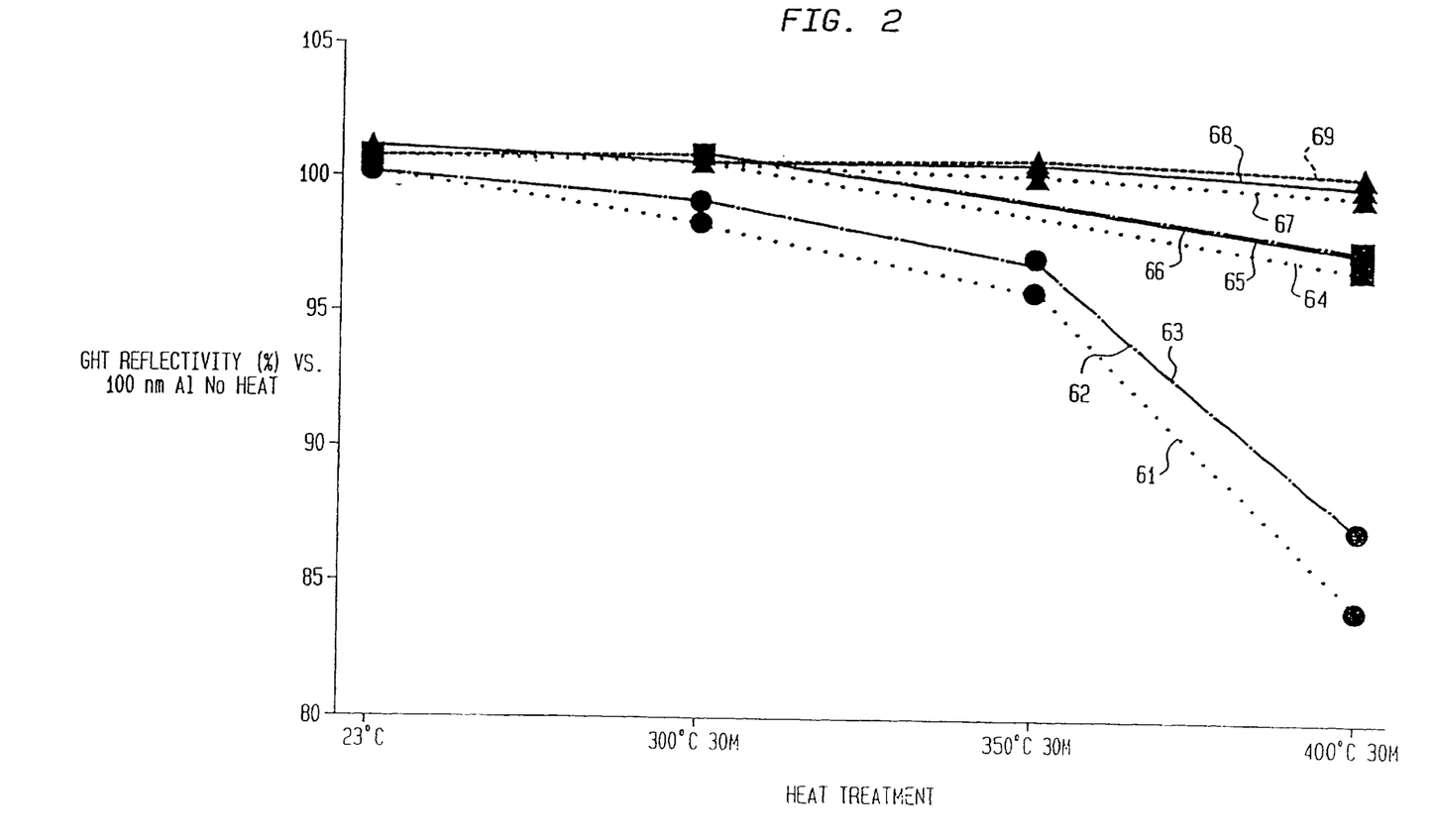
FIG. 2 is a graph of the reflectivity versus heat treatment for an aluminum mirror of various thicknesses.

FIG. 2 is a graph of the reflectivity versus heat treatment for an Al mirror of various thicknesses. In FIG. 2, the ordinate represents reflectivity of light in percent (relative to 100 nm Al unannealed) and the abscissa represents heat treatment at a temperature for 30 minutes. The Al mirror was formed by evaporating Ti over silicon dioxide to a thickness of 10 nm followed by evaporating Al over the Ti layer. The Al was deposited to a thickness of 50 nm shown by the solid circles interconnected to form curves 61–63. Curves 61–63 correspond to the wavelength of light of 450 nm, 550 nm, and 680 nm respectively. For Al deposited to a thickness of 100 nm, solid squares are shown interconnected by curves 64–66. Curves 64–66 correspond to the wavelength of light of 450 nm, 550 nm, and 680 nm respectively. For Al deposited to a thickness of 150 nm, solid triangles are shown in FIG. 2 interconnected by curves 67–69. Curves 67–49 correspond to the wavelength of light of 450 nm, 550 nm, and 680 nm respectively. Based on these results, an Al mirror thickness of 150 nm was chosen with a 10 nm Ti layer underneath for improved adhesion and contact resistance. Alloying the Al with Cu slightly reduces the reflectivity with low temperature annealing but the reflectivity after annealing at 400° C. is significantly better due to the reduced hillock formation compared with pure Al.

Figure 3:
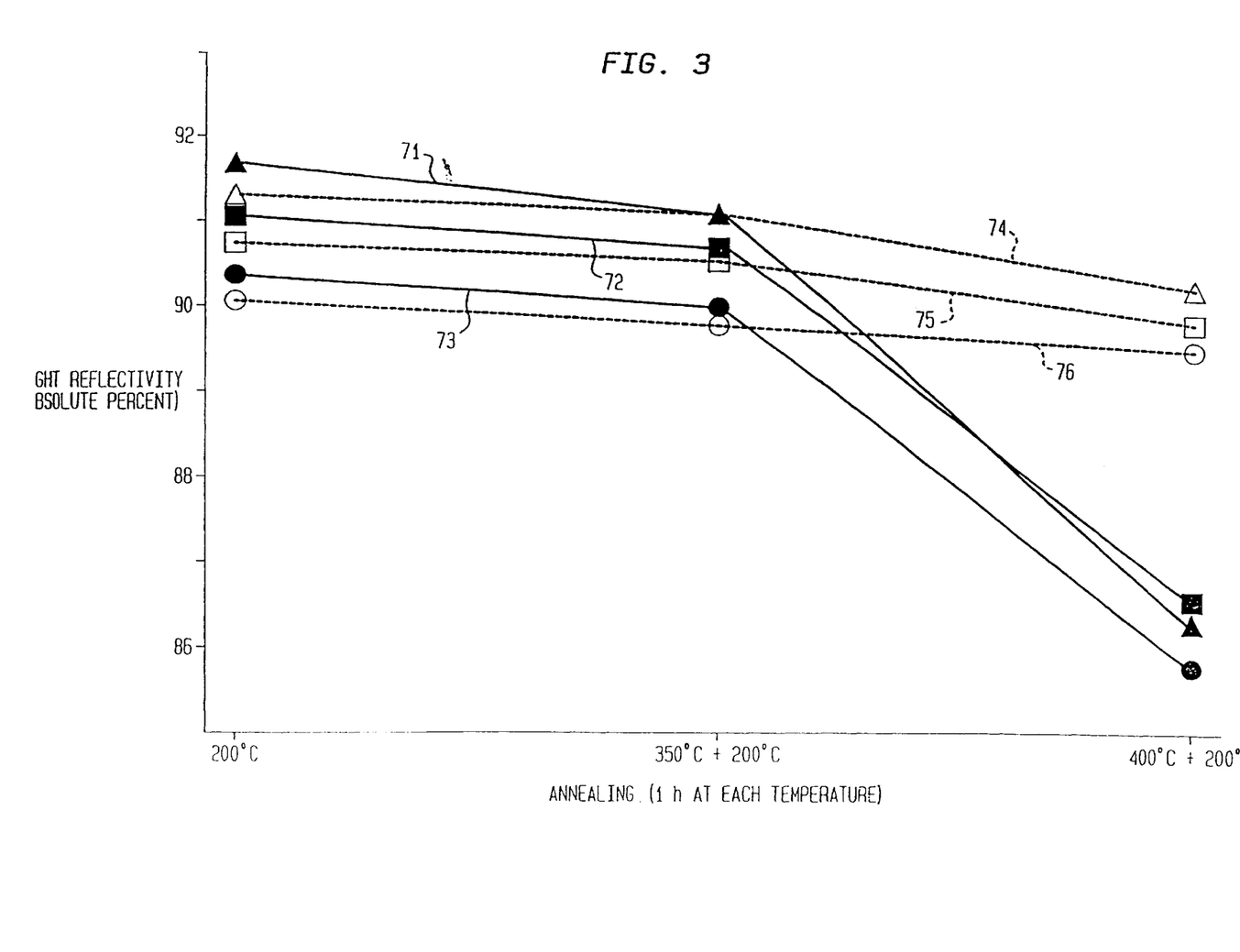
FIG. 3 is a graph of the reflectivity versus annealing temperature for aluminum and for an aluminum (0.5 wt. % copper) alloy.

FIG. 3 is a graph of the reflectivity versus annealing for Al and for an Al (0.5.omega.t. % copper) alloy. In FIG. 3, the ordinate represents reflectivity of light and the abscissa represents annealing at 200° C., 350° C. and 200° C., and 400° C. and 200° C. where each temperature is maintained for 1 hour. Curves 71–73 are for data points shown by a solid triangle, square, and circle respectively and are for a silicon dioxide layer, a 10 nn Ti layer thereover and a 177 nm Al blanket layer over the Ti blanket layer. Curves 74–76 are for data points shown by the outline of a triangle, square, and circle respectively and are for a silicon dioxide layer, a 10 nm Ti layer thereover and a 173 nm Al(0.5 .omega.t. % Cu) blanket layer over the Ti blanket layer. Curves 71 and 74 show the reflectivity for light at 450 nm (blue). Curves 72 and 75 show the reflectivity for light at 550 nm (green). Curves 73 and 76 show the reflectivity for light at 625 nm (red). Bulk Al has a reflectivity of about 92%. As can be seen in FIG. 3 by curves 71–73, the reflectivity drops below 87% for an anneal temperature of 400° C. at 1 hour and a temperature of 200° C. at 1 hour. Curves 74–76 show only slight degradation of about 0.5 to 0.8% in reflectivity at the above anneal temperatures and times. However, the reflectivity shown by curves 74–76 stays above 89.3%. The reason for better reflectivity is due to less hillocks forming during annealing at 400° C. with Al (0.5 .omega.t % Cu) films.

The flatness of the mirrors depends on the planarity of the surface on which the mirrors are formed. A chemical-mechanical polished (CMP) insulator layer for planarized mirrors on a semiconductor substrate containing the drive elements may be used. Dielectric layer 42 may be formed over metal layer 22 which is shown in FIG. 1 as being patterned is polished resulting in a planar surface below the reflector/absorber layer 34 shown in FIG. 1. Chemical-mechanical polishing is very successful in forming a planar dielectric layer 46 and electrical/mirror 30, results from optical pattern (OP) and capacitor (C) test structures are shown in FIG. 4.

Figure 4:
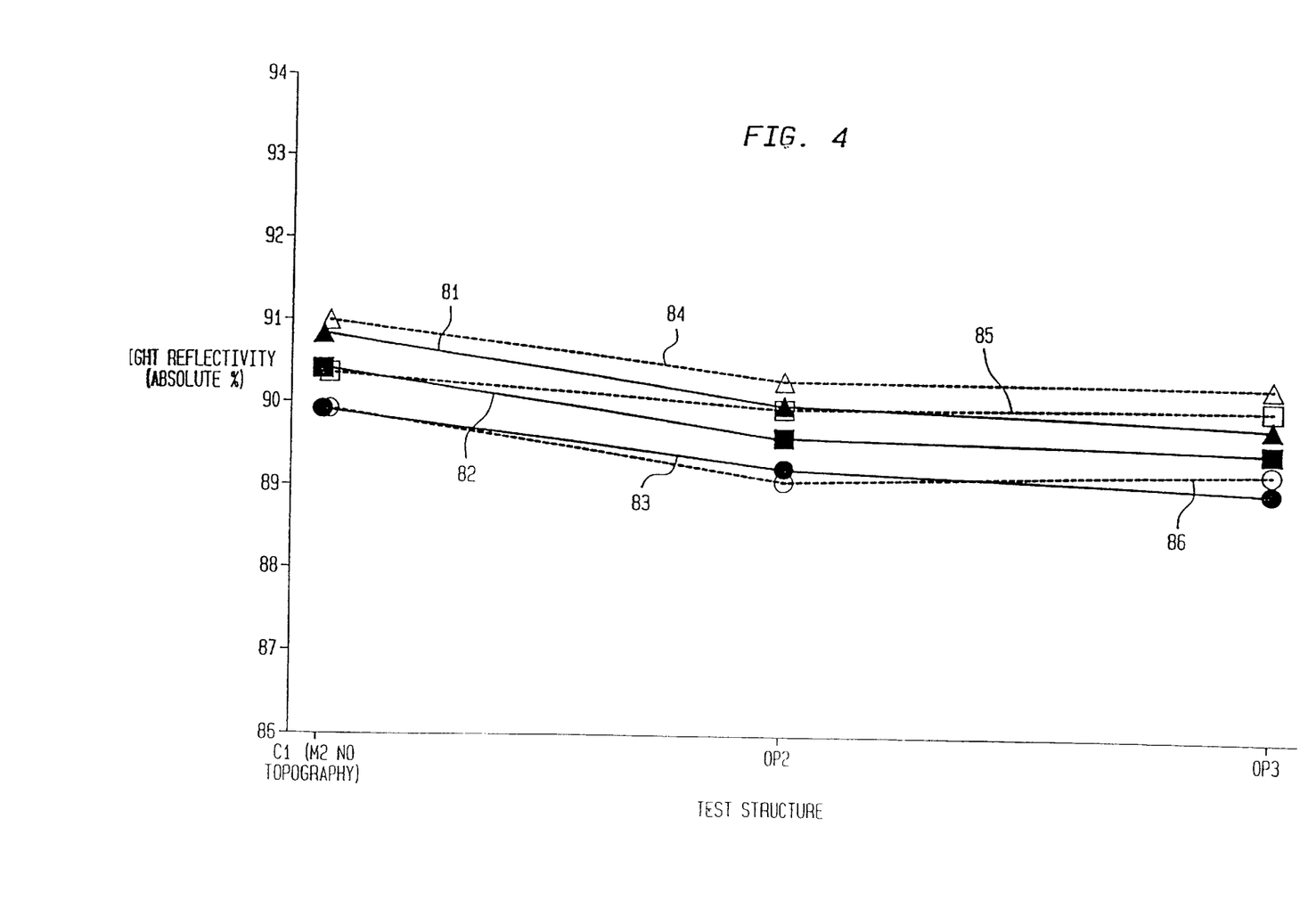
FIG. 4 is a graph of the reflectivity versus optical test structures C1, OP2, and OP3.

FIG. 4 is a graph of reflectivity versus optical test structures C1, OP2 and OP3 to show the acceptable reduction in reflectivity due to underlying integrated circuits and interconnections. In FIG. 4 the ordinate represents Reflectivity (absolute %) and the abscissa represents three test structures i.e. C1, OP2, AND OP3. Test structure C1 represents as shown in FIG. 1, a substrate 14, dielectric layers 36, 42, 44, and 46, and with bottom electrode/mirror 30 comprising a 150 nm Al blanket mirror on a region with no underlying topography i.e. all blanket layers. Test structure OP2 represents as shown in FIG. 1, a substrate 14, dielectric layers 36, 40, 42, 44 and 46, blanket metal layer 22, stud 17, reflector/absorber layer 34 on a 17 µm grid patterned and with bottom electrode/mirror 30 comprising a blanket layer of 150 nm thick Al. Test structure OP3 represents the structure of OP2 except metal layer 22 is also patterned on a 17 µm grid to reflect typical electrical interconnections below blanket electrode/mirror 30. Curves 81–83 represents one sample wafer and curves 84–86 represents a second sample wafer. The solid triangle, square, and circle correspond to curves 81–83 respectively for wavelengths of light or radiant energy of 450 nm (blue), 550 nm (green), and 620 nm (red). The outline of the triangle, square and circle correspond to curves 84–86 respectively for wavelengths of light or radiant energy of 450 nm, 550 nm and 620 nm. As shown in FIG. 4, the increasing topology affects the absolute reflectivity, with no test sample having a reflectivity below 89.1%. The lowest reflectivity was for curves 83 and 86 at 620 nm (red light). Stud 17, the patterning of metal layer 22 and reflector/absorber layer 34 of test structures OP2 and OP3, decreased reflectivity about 0.3 to 1% depending on the wavelength of light. The major contributing factor to the decrease in reflectivity is probably due to the depression or "dimple" formed by the electrode/mirror 30 above stud 17 which was dished out during CMP planarization of the W layer used to fill stud 17.

The contrast ratio of the spatial light modulator 10 can be degraded by light reflected from the exposed reflector/absorber layer 34 between pixel electrodes/mirrors 30 and 33. This is an additional reason for reducing the reflectivity of the reflector/absorber layer 34 as much as is possible. The contrast also depends on the liquid crystal mode used and what electric fields are present between the pixels since the reflected light will need to have the correct polarization to appear as part of the image. The thickness of the dielectric layer 46 of $Si_3N_4$ over the reflector/absorber layer can also be adjusted in thickness such as a quarter wavelength to cause destructive interference for a given wavelength of light.

To minimize semiconductor device processing changes and pixel size, a significant portion of the pixel storage capacitance was included in the metallization, between the reflector/absorber layer 34 and the pixel electrode/mirror 30. The reflector/absorber layer 34 is connected to a fixed potential and the reflector/absorber layer 34 to electrode/mirror 30 overlap region such as about 230 µm$^2$ per pixel which provides a portion of the pixel capacitor. A layer of $Si_3N_4$ is used as the insulator since $Si_3N_4$ has a higher dielectric constant, about 7, than $SiO_2$ which may be near 4.1. Large area capacitors of 0.5 & 3 cm$^2$ with this structure have values of about 14 nF/cm$_2$. It is necessary to have sufficient pixel storage capacitance to hold the voltage across the liquid crystal device 12 with sufficient accuracy to allow the desired number of grey levels until the data is refreshed or updated.

Precise control of both the absolute value and uniformity of the liquid crystal device 12 thickness is required for high contrast and good uniformity. The desired device gap is determined by the liquid crystal material 26 used, the liquid crystal mode selected, and the wavelength of light. Liquid crystal device 12 gap is determined by a uniform blanket layer of $SiO_2$ of the correct thickness deposited over the mirrors and patterned to leave spacer posts at the corners of the mirrors. The density of spacer posts 32 used was determined from finite-element stress modeling and a range of about 70 to 140 µm between spacer posts 32 has been used. It is desirable to minimize the number or density of spacers because the liquid crystal material 26 is not aligned correctly around the spacer posts 32 and this misalignment reduces the contrast ratio and the misalignment can appear in the image when the reflected light is projected onto a display screen.

Figure 5:
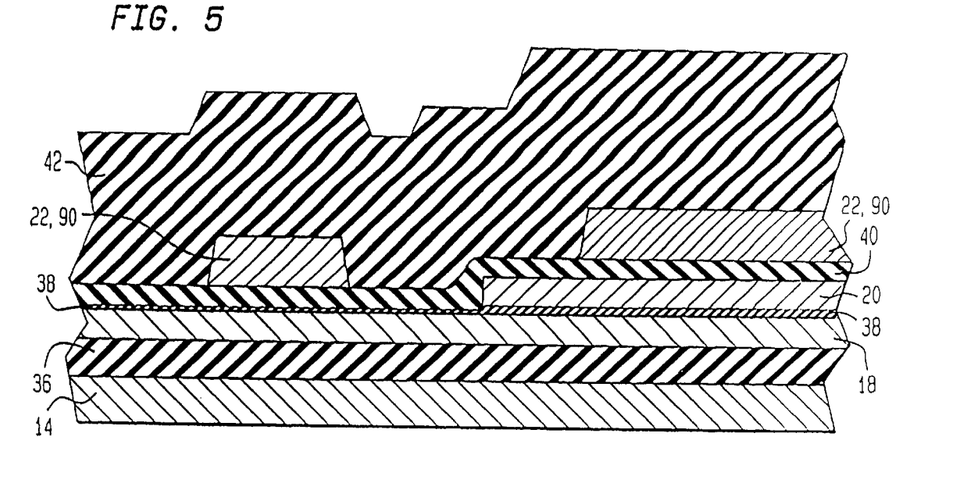
FIGS. 5–10 are cross section views after selected processing steps for building the embodiment shown in FIG. 1.

The method for making spatial light modulator 10 shown in FIG. 1 will now be described with reference to FIGS. 5–10. FIGS. 5–10 are cross section views of a partially built spatial light modulator 10 after various processing steps have been performed. In FIGS. 5–10, like references are used for functions corresponding to the apparatus of FIG. 1. After the semiconductor device processing is completed in semiconductor substrate 14, a liftoff stencil is patterned by photolithography, a layer of Si and then 0.7 µm Al(Cu) are evaporated, and the liftoff stencil is removed with a suitable solvent, leaving the metallization in the desired regions. The Si layer is needed to prevent dissolution of Si from the devices into the Al and spiking of the contact regions during subsequent thermal treatments. The separate Si layer which is below metal layer 22 is not shown in FIGS. 1 or 5. After the metal layer 22 liftoff is completed to form patterned layer 90, a thick conformal dielectric layer 42 such as silicon dioxide for example may be deposited, as shown in FIG. 5.

The next process step is chemical-mechanical polishing (CMP) of the dielectric layer 42 to provide a planar or flat surface reflector/absorber layer 24 to be formed thereon. The topography may be greater than for typical very large scale integration (VLSI) and the chip size is very large.

Figure 6:
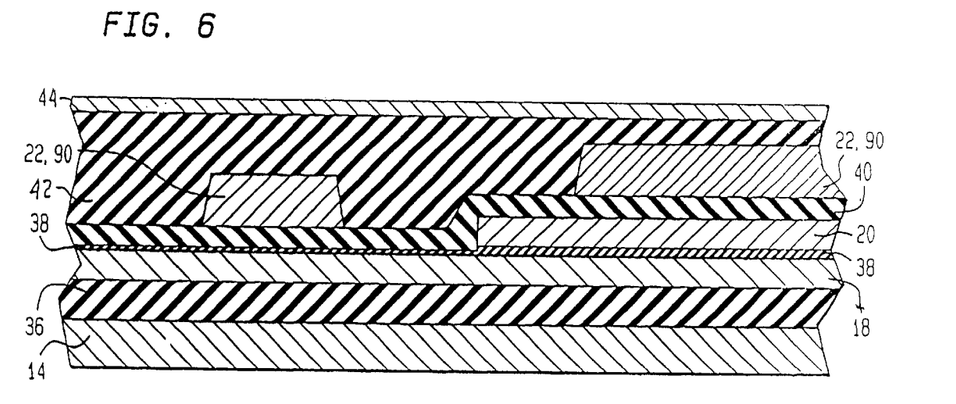

As shown in FIG. 6, a single CMP step is used to planarize dielectric layer 42 from the topography arising from both the Si devices and patterned layer 90 simultaneously. The greater than usual topographic variation increases the difficulty of planarization. The large chip size causes two problems; a larger area which needs global planarization and larger regions with different pattern densities. To clarify this, the chip contains regions such as the array with a high density of polysilicon layers 18 and 20 and patterned layer 90 whereas the contact area contain a similar patterned layer 90 density but only limited polysilicon layer 18 and 20, and further some regions contain none of these layers. Once these regions are sufficiently large, the polishing pad is unable to "bridge" over them and global planarization is difficult or impossible. This problem was solved by adding "dummy" polysilicon layers 18 and 20 and patterned layer 90 features during the chip design so that the pattern density is uniform enough on a small enough scale that global planarization can be achieved. At the CMP endpoint, about 500 nm of dielectric such as silicon dioxide remains over the highest patterned layer 90 feature.

Next as shown in FIG. 6, an about 200 nm dielectric layer 44 is formed or deposited on the upper surface 43 of dielectric layer 42 as protection against any pin holes in dielectric layer 42 and any conductors of patterned layer 90 exposed by scratching. Dielectric layer 44 was found to be a critical step for reaching a high yield as any exposed shorts in patterned layer 90 to the nearly blanket reflector/absorber layer 34 would cause a failure.

Figure 7:
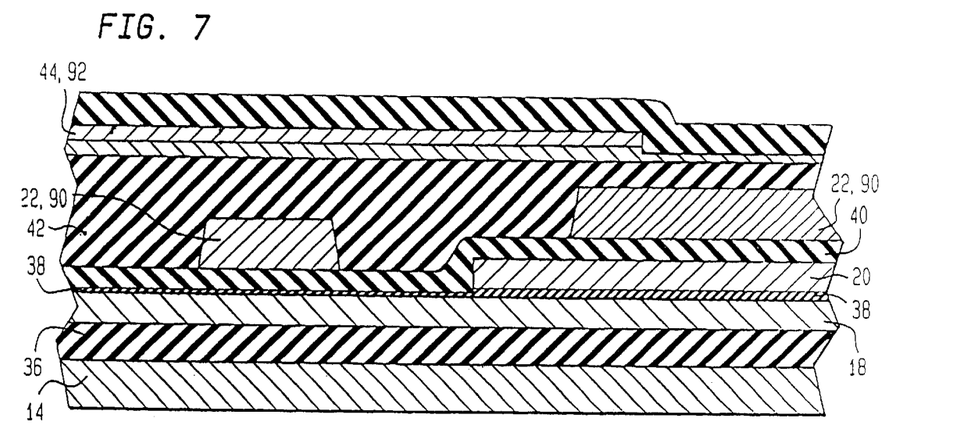
Figure 8:
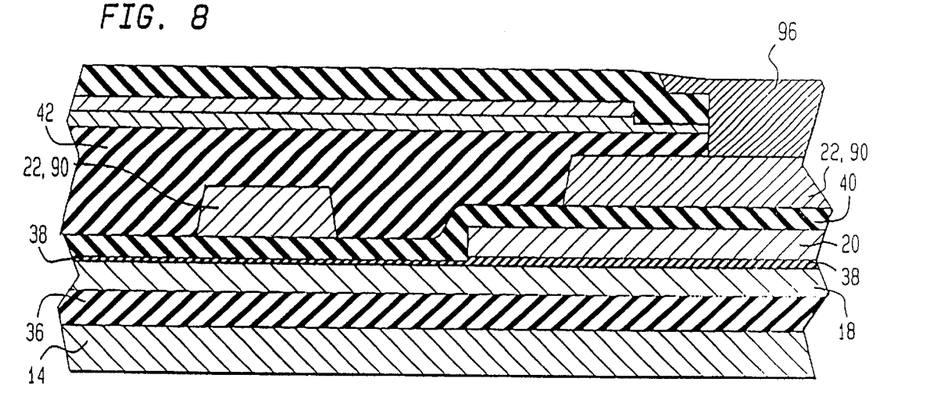

The reflector/absorber layer 34 is formed by sputter deposition of 10 nm Ti, 100 nm Al(Cu), and 50 nm TiN and patterning by reactive ion etching (RIE). The bottom Ti layer 92 which is part of layer 34 shown in FIG. 7 is used for improved adhesion and contact resistance, a top or surface TiN layer 94 which is part of layer 34 shown in FIG. 7 is used as an antireflection coating, the bulk of the metallization is Al(Cu) layer 93 and metal layers 92–94 are patterned by RIE. TiN layer 94 is provided on the Al(Cu) layer 93 to reduce reflections so that fine features can be patterned by photolithography. Titanium nitride was used on the surface of reflector/absorber layer 34 since the necessary process steps were already available even though a lower red reflectivity would be desirable. One possibility would be to add carbon to the TiN: $TiN_0.33$ $C_0.67$ has been reported in "Optical Constants and Spectral Selectivity of Titanium Carbonitrides", by B. Karlsson, Thin Solid Films, p. 181, 87 (1982) to have a reflectivity of about 30% for all the wavelengths of interest. After the reflector/absorber layer 34 is patterned, a 400–500 nm layer of $Si_3N_4$ is deposited to form dielectric layer 46 as shown in FIG. 7. The thickness of dielectric layer 46 is a compromise between a thinner layer for greater capacitance between reflector/absorber layer 34 and electrode/mirror 30 and a thicker layer which would reduce the probability of reflector/absorber layer 34 and electrode/mirror 30 defects and shorts.

Figure 9:
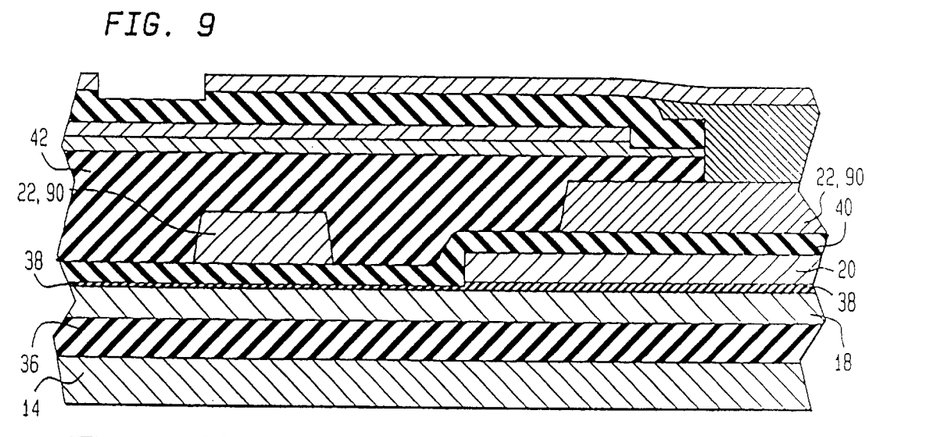

The next step is to pattern the $Si_3N_4$ layer and the $SiO_2$ down to patterned layer 90 with the via mask, V1, for stud 17. The etching depth needs to be adequate to compensate for the variations in the $SiO_2$ thickness over the patterned layer 90. Stud 17 may be formed of tungsten by sputtering a Ti and TiN liner layer, growing a chemical vapor deposited (CVD) W layer, and removing the excess W outside the features by CMP. A "dimple" may be formed which is nearly as wide as the reflector/absorber layer 34 opening due to the higher polishing rate of W versus $Si_3N_4$ and the "dishing" which occurs during CMP as shown at surface 96 in FIGS. 1 and 8. Electrode/mirror 30 is formed by evaporation or sputtering of 10 nm Ti followed by 150 nm of Al, Al(Cu) or other alloy. The Ti layer is used for improved adhesion and contact resistance. The photolithography is difficult due to the high reflectivity of the electrode/mirror layer 30, which is then patterned by RIE, as shown in FIG. 9. The rigid spacer posts 32 are formed by depositing a greater than 3 µm silicon dioxide layer on the wafer. The photolithography process for patterning spacer 32 is complicated by the tremendous variation in reflectivity for the ultraviolet light (UV) used between the exposed TiN layer and the Al layer. Since spacer 32 height uniformity is of critical importance for the liquid crystal device 12 performance, the $SiO_2$ deposition process was optimized to give a uniformity of better than 2% (one sigma). The blanket $SiO_2$ layer 31 is patterned by RIE with the process adjusted to have a low $Si_3N_4$ etch rate so that the over etching required does not expose the reflector/absorber layer 34 in the gap 56 between electrode/mirrors 30 and 33. The final process step is the terminal via (TV) etch which removes the $Si_3N_4$ and $SiO_2$ layers over the patterned layer 90 contacts (not shown) and test pads (not shown) in FIG. 10.

One detail not covered by the above description or shown in the drawing is how electrical contact is made to the reflector/absorber layer 34 outside the array. By using a combination of an opening 57 in reflector/absorber layer 34 which is smaller than a via or stud 17, an interconnection from patterned layer 90 or electrode/mirror 30 to reflector/absorber layer 34 can be made since the reflector/absorber layer 34 contains 100 nm of Al(Cu) which acts as an etch stop during the patterning of an opening for via or stud 17. The only difficulty with this approach is if the via 17 opening etch does not stop in the Al layer, in which case only an edge contact is formed. For this reason, the design rules call for redundant reflector/absorber 34 electrical contacts which is not a performance impact since only a limited number of contacts to reflector/absorber layer 34 is needed.

Figure 10:
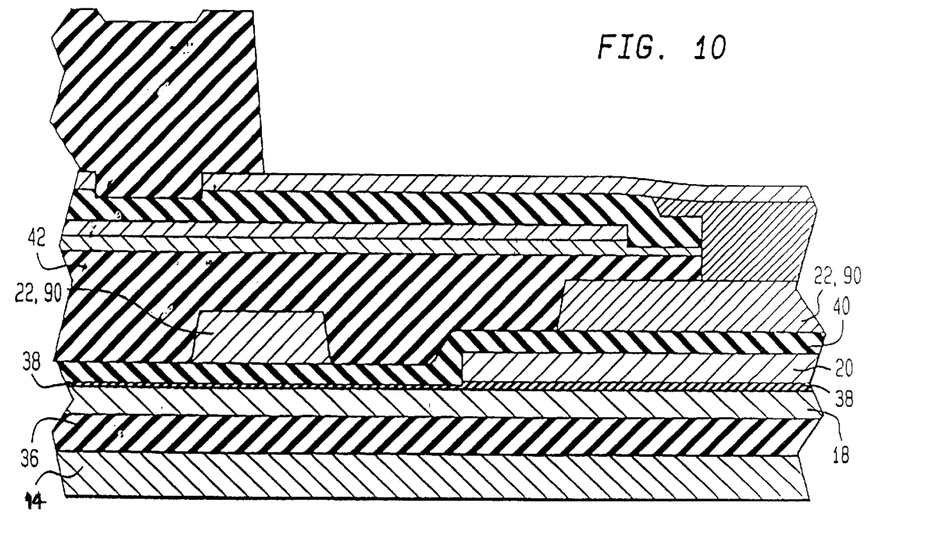
Figure 11:
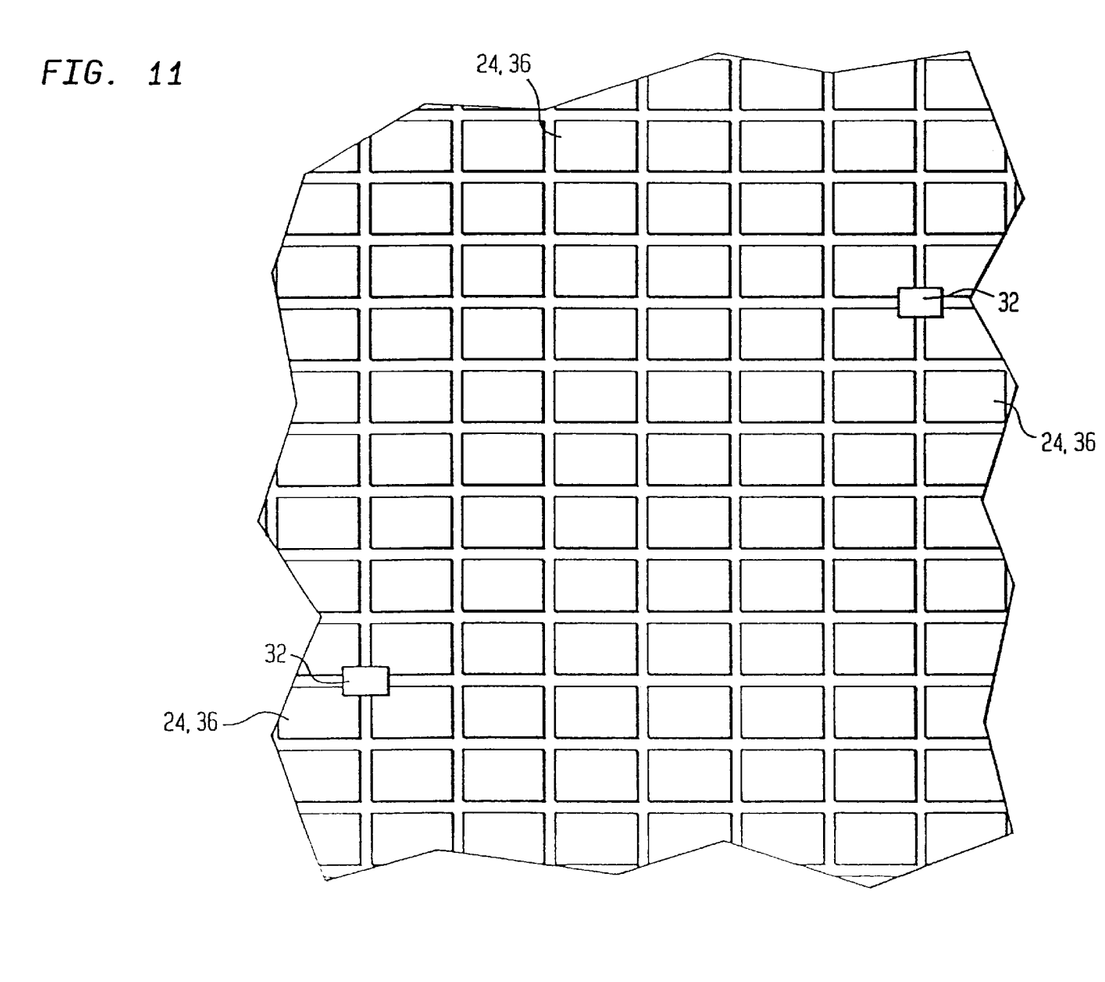
FIG. 11 is a scanning electron micrograph top view of the structure shown in FIG. 10.
Figure 12:
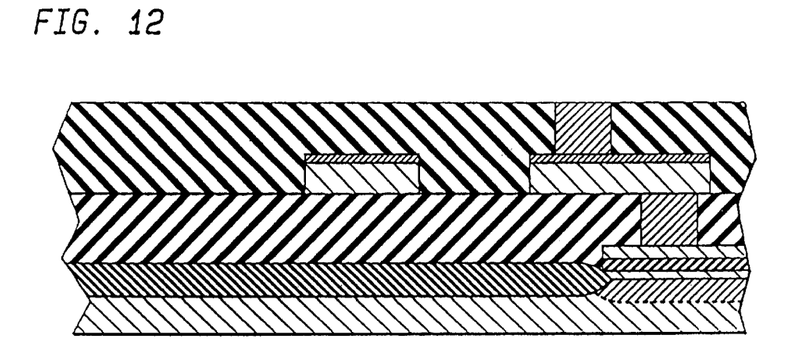
FIGS. 12–17 are cross section views after various processing steps for fabricating an alternate embodiment of the invention.

FIG. 11 shows a scanning electron micrograph of an array 11 of spatial light modulators 10 without liquid crystal material 26, top electrode 28 or glass cover plate 29 shown in FIG. 10. Some Al hillocks are evident on the electrode/mirrors 34. Two spacer posts are shown spaced in the row direction by 6 rows and in the column direction by 6 columns. The dimple in each electrode/mirror 30 is from via or stud 17 and is evident because of the increased electron scattering by the top of the tungsten stud 17 underneath electrode/mirror 34. The brightest region corresponds to the W forming the tungsten stud 17 and the surrounding slightly darker region to the reflector/absorber layer opening reduced by the $Si_3N_4$ thickness as shown in FIGS. 1 and 11.

An alternate process which would support smaller pixel sizes and a second level of metal for interconnections outside the spatial light modulator array is shown in FIGS. 12–17. FIGS. 12–17 are cross section views after selected processing steps for fabricating spatial light modulator array 10. In FIGS. 12–17 like references are used for functions corresponding to the apparatus of FIG. 1.

Figure 13:
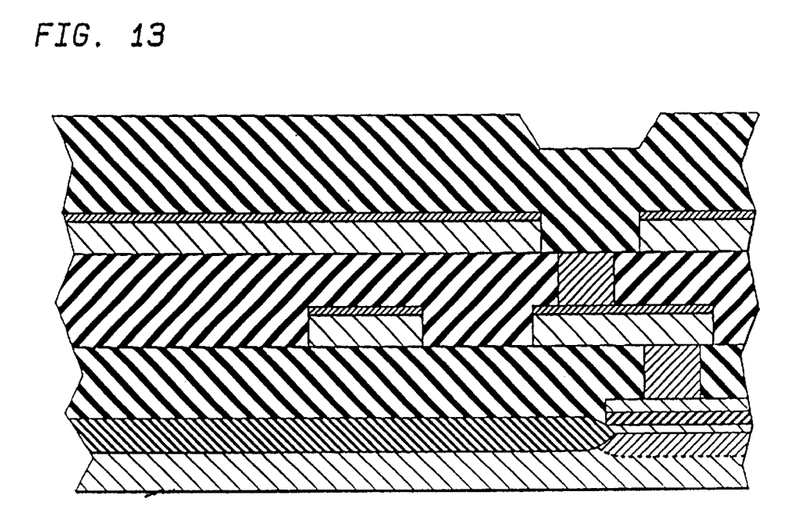
Figure 14:
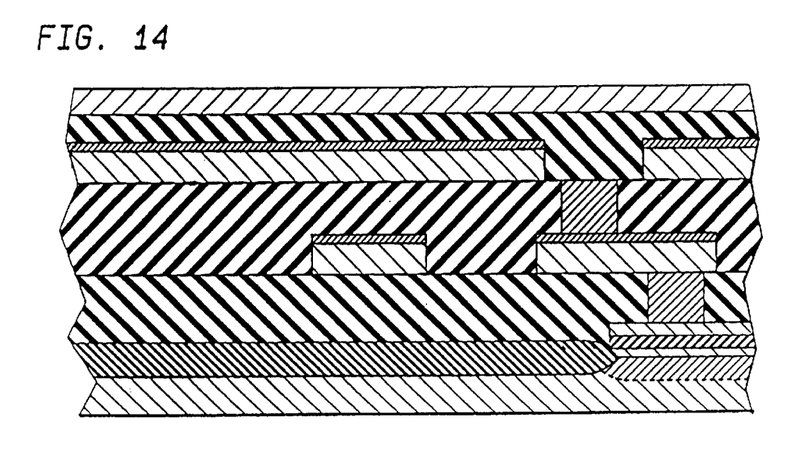
Figure 15:
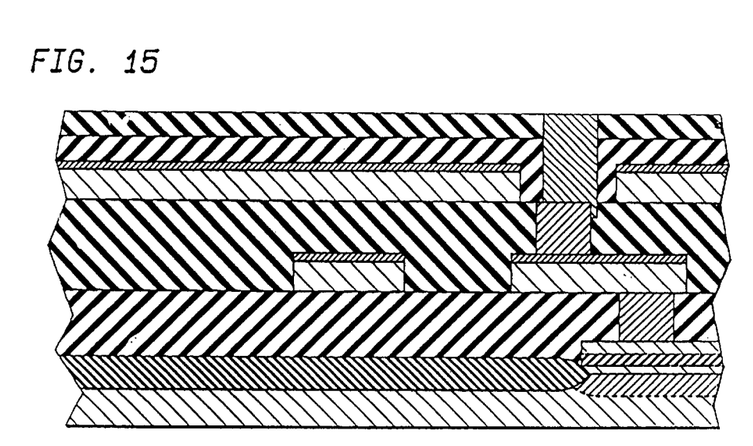
Figure 16:
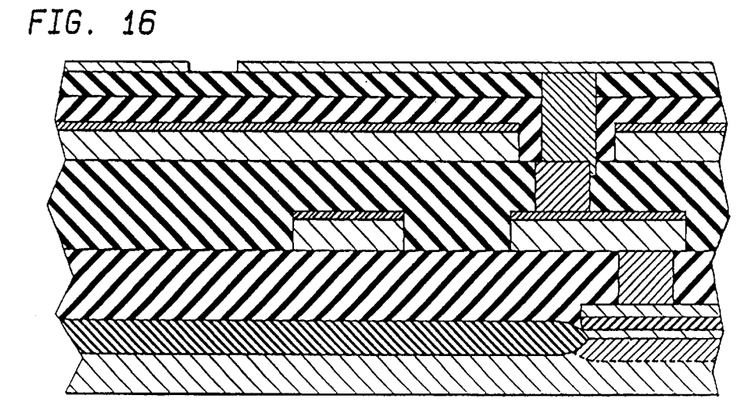
Figure 17:
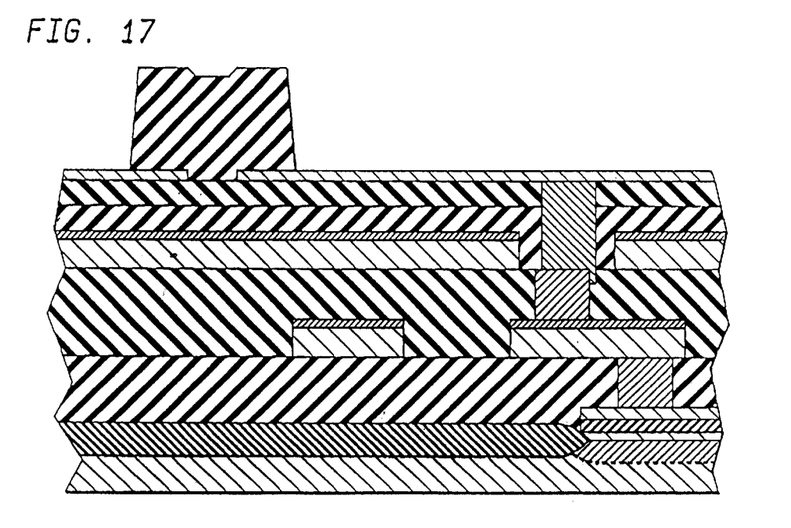

Starting from the Si devices, a total of eight masks would be needed (three metal levels, three via/stud levels, and two insulator levels). Starting at the S1 level, FIG. 12, the reflector/absorber layer 34 is patterned to function as the reflector/absorber layer 34 within spatial light modulator array 10 and as M2 wiring outside of the array area of spatial light modulators 10 as shown in FIG. 13. The planarized $SiO_2$ over electrode/mirror 30 is capped with an $Si_3N_4$ dielectric layer 46 which is used as an etch stop between mirrors during the etching of dielectric layer 32 to form spacer posts 32 as shown in FIG. 17. Inside the spatial light modulator array 10, to get the most effective light shielding, the S2 stud is stacked directly on the S1 stud as shown in FIG. 15. Alternatively, an M2 segment could be interposed between the two studs but this would require a larger break in the M2/AR layer which would be more likely to permit light through to the semiconductor substrate below. The M3 mirror layer is formed by Al or Al(Cu) deposition and patterning as shown in FIG. 16. With improved lithography, the interpixel spacing can be reduced for a high fill factor even with small pixel sizes. The M3 mirror is used as a light blocking layer outside the array where M2 is used for wiring or outside the liquid crystal glue seal area an opaque polymer could be applied during packaging after the electrical contacts are made. The final two lithographic steps are used to form the $SiO_2$ spacers and expose the M2 contact and test pads. One of the key advantages of this process is that M2 is available outside of the array for wiring, which enables the integration of the data drivers onto the chip.

A spatial light modulator array based on a reflective liquid crystal which may have 2048 by 2048 pixels has been described. The array comprises a plurality of liquid crystal devices positioned over respective mirrors on a dielectric layer on a semiconductor substrate, a plurality of electrical circuits formed in the semiconductor substrate for placing a voltage across the liquid crystal device to modulate light passing therethrough, and a reflector/absorber layer positioned and patterned with respect to the mirrors for shielding or blocking light from passing into the semiconductor substrate containing the electrical circuits, the reflector/absorber layer having an edge overlapping an edge of the mirror to form an overlapping region to decrease ambient light from passing into the semiconductor substrate and to provide a capacitor for maintaining a voltage on the mirror which functions as the bottom electrode of the respective liquid crystal device.

A six mask process (after Si device processing) has been described using standard semiconductor manufacturing tools to fabricate the spatial light modulator array 10 shown in FIG. 1. Spatial light modulator 10 as described meets the following requirements: 1) shielding the Si from the incident light, 2) high optical throughput and contrast, 3) pixel storage capacitance, and 4) precise control of the liquid crystal cell thickness without spacers obscuring the mirrors. The pixel size of a spatial light modulator in the array may be 15.6 µm on a side or more using the process flow described in FIGS. 5–10 or smaller pixels with the more advanced process described in FIGS. 12–17.

While there has been described and illustrated a spatial light modulator array containing liquid crystal devices, electrical circuits, an electrode/mirror and a reflector/absorber layer to block light from interfering with the electrical circuits, it will be apparent to those skilled in the art that modifications and variations are possible without deviating from the broad scope of the invention which shall be limited solely by the scope of the claims appended hereto. The teachings of all references cited herein are incorporated herein by reference.

Having thus described our invention, what we claim as new and desire to secure by Letters Patent is:

1. A spatial light modulator array for modulating light to form an image comprising:
    a plurality of liquid crystal devices positioned over respective mirrors on a dielectric layer on a semiconductor substrate,
    a plurality of electrical circuits formed in said semiconductor substrate coupled to said liquid crystal devices, respectively, for placing a voltage across its electrodes, and
    a reflector/absorber layer positioned and patterned with respect to said mirrors for shielding said plurality of electrical circuits from ambient light,
    said ref lector/absorber layer having an edge overlapping an edge of said mirror to form an overlapping region to decrease ambient light from passing into said semiconductor substrate.

2. The spatial light modulator array of claim 1 wherein reflector/absorber layer overlaps said edge of said mirror by at least 5.4 $\mu$m.

3. The spatial light modulator array of claim 1 wherein said mirrors are formed from a metal layer wherein said metal is selected from the group consisting of Ag, Al and alloys thereof.

4. The spatial light modulator array of claim 1 wherein said mirrors have a supporting layer having a substantially planar upper surface and said mirrors include a respective metal layer for reflecting light on said substantially planar upper surface of supporting layer.

5. The spatial light modulator array of claim 4 wherein said supporting layer includes dielectric material and electrical viasfor electrical connection to said metal layer.

6. The spatial light modulator array of claim 1 wherein plurality of liquid crystal devices have a thickness determined by a dielectric layer having openings formed over said respective mirrors.

7. The spatial light modulator array of claim 6 wherein said dielectric layer includes material selected from the group consisting of $SiO_2$, $Si_3Ni_4$, diamond-like carbon, and polyimide.

8. The spatial light modulator array of claim 6 wherein said respective mirrors form the lower electrode of said plurality of liquid crystal devices and being electrically coupled to respective outputs of said plurality of electrical circuits.

9. The spatial light modulator array of claim 1 wherein said reflector/absorber layer is selected from the group consisting of Al, Cr—$CrXOY$, Ti and TiN and $TiN_xC_y$.

10. The spatial light modulator array of claim 1 wherein said reflector/absorber layer is electrically conductive and forms a blanket layer over said semiconductor substrate with openings therein for electrical vias to said mirrors.

11. The spatial light modulator array of claim 1 wherein said electrical circuits include complementary metal oxide silicon(CMOS) circuits.

12. The spatial light modulator array of claim 1 wherein each of said mirrors and said reflector/absorber layer forms a capacitor of at least 0.03 pf.

13. The spatial light modulator array of claim 1 wherein said liquid crystal devices are positioned in rows and columns on pitch in each of two directions of about 17 microns or less.

14. A liquid crystal display apparatus for displaying an image, comprising:
    a substrate;
    a plurality of switching elements being formed on said substrate;
    a first electrode connected with said switching element and positioned over said switching element;
    a storage capacitor connected with said first electrode and positioned under said first electrode;
    an optical reflector formed on said first electrode and a frame;
    a first orientation film formed on said optical reflector;
    a second orientation film spaced apart from said first orientation film;
    a second transparent electrode on which said second orientation film is formed;
    a layer of liquid crystal material positioned between said first and second orientation films; and
    substantially nonconductive optical blocking means positioned between said first electrode and said switching element for blocking an incident light from leaking into said switching element.

15. The apparatus of claim 14, wherein said optical blocking layer is formed of cadmium telluride.

16. The apparatus of claim 14, wherein said optical blocking layer is formed of germanium oxide.

17. A spatial light modulator according to claim 14 wherein said substantially conductive optical blocking means is selected from the group consisting of silicon nitride, silicon dioxide, silicon germanium, and polymers.

18. A spatial light modulator according to claim 17 wherein said polymers are selected from the group consisting of substituted and unsubstituted polyanilines, substituted and unsubstituted polyparaphenylenevinylenes, substituted and unsubstituted polythiophenes, substituted and unsubstituted polyazines, substituted and unsubstituted polyparaphenylenes, substituted and unsubstituted polyfuranes, substituted and unsubstituted polypyrroles, substituted and unsubstituted polyselenophene, substituted and unsubstituted poly-p-phenylene sulfides and substituted and unsubstituted polyacetylenes, and mixtures thereof, and copolymers thereof.

19. A liquid crystal display apparatus for displaying an image, comprising:
    a substrate;
    a plurality of switching elements being formed on said substrate;
    a first electrode connected with said switching element and positioned over said switching element;
    a frame composition disposed along an edge of said first electrode, with said frame composition being composed of optical blocking insulating material for blocking incident light from leaking into said switching element;
    a storage capacitor connected with said first electrode and positioned under said first electrode;
    an optical reflector formed on said first electrode;

a first orientation film formed on said optical reflector;

a second orientation film spaced apart from said first orientation film;

a second transparent electrode on which said second orientation film formed; and a layer of liquid crystal material positioned between said first and second orientation films.

20. The apparatus of claim 19, wherein said optical blocking material is cadmium telluride.

21. The apparatus of claim 19, wherein said optical blocking material is germanium oxide.

22. A liquid crystal display apparatus for displaying an image, comprising:

a substrate;

a plurality of switching elements being formed on said substrate;

a first electrode connected with said switching element and positioned over said switching element;

nonconductive optical blocking material formed under said first electrode;

a storage capacitor connected with said first electrode and positioned under said first electrode;

an optical reflector formed on said first electrode;

a first orientation film formed on said optical reflector;

a second orientation film spaced apart from said first orientation film;

a second transparent electrode formed on said second orientation film; and a layer of liquid crystal material positioned between said first and second orientation films.

23. The apparatus of claim 22, wherein said optical blocking material is cadmium telluride.

24. The apparatus of claim 22, wherein said optical blocking material is germanium oxide.

25. A spatial light modulator array for modulating light to form an image comprising:

a plurality of liquid crystal devices positioned over respective mirrors on a dielectric layer on a semiconductor substrate, a plurality of electrical circuits formed in said semiconductor substrate coupled to said liquid crystal devices, respectively, for placing a voltage across its electrodes, and a reflector layer positioned and patterned with respect to said mirrors for shielding said plurality of electrical circuits from ambient light, said reflector layer having an edge overlapping an edge of said mirror to form an overlapping region to decrease ambient light from passing into said semiconductor substrate.

26. A spatial light modulator array for modulating light to form an image comprising:

a plurality of liquid crystal devices positioned over respective mirrors on a dielectric layer on a semiconductor substrate, a plurality of electrical circuits formed in said semiconductor substrate coupled to said liquid crystal devices, respectively, for placing a voltage across its electrodes, and an absorber layer positioned and patterned with respect to said mirrors for shielding said plurality of electrical circuits from ambient light, said absorber layer having an edge overlapping an edge of said mirror to form an overlapping region to decrease ambient light from passing into said semiconductor substrate.

* * * * *